(12) United States Patent
Haas et al.

(10) Patent No.: US 8,250,324 B2
(45) Date of Patent: Aug. 21, 2012

(54) METHOD TO EFFICIENTLY LOCATE META-DATA STRUCTURES ON A FLASH-BASED STORAGE DEVICE

(75) Inventors: Robert Haas, Reuschlikon (CH); Xiao-Yu Hu, Rueschlikon (CH); Roman A. Pletka, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 12/627,414

(22) Filed: Nov. 30, 2009

(65) Prior Publication Data

US 2011/0131231 A1 Jun. 2, 2011

(51) Int. Cl.
*G06F 12/00* (2006.01)
(52) U.S. Cl. ........ 711/162; 711/156; 711/170; 711/202; 711/221
(58) Field of Classification Search ................ None
See application file for complete search history.

(56) References Cited

U.S. PATENT DOCUMENTS

| 7,509,474 | B2 | 3/2009 | Wong |
| 7,529,880 | B2 | 5/2009 | Chung et al. |
| 2008/0126684 | A1 | 5/2008 | Wu et al. |
| 2008/0201518 | A1 | 8/2008 | Kim et al. |
| 2009/0106486 | A1 | 4/2009 | Kim et al. |

OTHER PUBLICATIONS

Li-Pin Chang et al., "Efficient Management for Large-Scale Flash-Memory Storage Systems with Resource Conservation," ACM Transactions on Storage, vol. 1; No. 4; pp. 381-418; Nov. 2005.
Intel, "Understanding the Flash Translation Layer (FTL) Specification," Intel Specification, Application Note/ AP-684; pp. 1-20; Dec. 1998.
Atsuo Kawaguchi et al., "A Flash-Memory Based File System," In Usenix Winter, pp. 155-164, 1995.
Jai Menon, "A Performance Comparison of RAID-5 and Log-Structured Arrays," Proc. of the 4th IEEE International Symposium on High Performance Distributed Computing; IEEE; 1995; pp. 167-178.
John Ousterhout et al., "Beating the I/O Bottleneck: A Case for Log-Structured File Systems," Operating Systems Review, vol. 23, No. 1, Jan. 1989.
David Woodhouse, "JFFS: The Journalling Flash File System," Ottawa Linux Symposium, pp. 1-12; Jul. 2001.
Chin-Hsien Wu et al., "An Efficient B-Tree Layer Implementation for Flash-Memory Storage Systems," ACM Transactions on Embedded Computing Systems, vol. 6, No. 3, Article 19, pp. 1-23; Publication Date: Jul. 2007.

*Primary Examiner* — Shawn X Gu
(74) *Attorney, Agent, or Firm* — Cantor Colburn LLP; Daniel Morris

(57) ABSTRACT

A method for facilitating fast reconstruction of metadata structures on a memory storage device includes writing a plurality of checkpoints holding a root of metadata structures in an increasing order of timestamps to a plurality of blocks respectively on the memory storage device utilizing a memory controller, where each checkpoint is associated with a timestamp, and wherein the last-written checkpoint contains a root to the latest metadata information from where metadata structures are reconstructed.

25 Claims, 8 Drawing Sheets

METHOD TO EFFICIENTLY LOCATE META-DATA STRUCTURES ON A FLASH-BASED STORAGE DEVICE

BACKGROUND

The present invention relates generally to flash memory systems and techniques for efficiently locating meta-data structures on flash-based storage devices.

Flash memory technology is an electrically rewritable non-volatile digital memory medium. Flash memory cells typically support write operations, read operations, and erase operations. As flash memory technology has evolved, opportunities in a variety of applications have become possible. In particular, flash memory implementations that emulate the mass storage function of conventional rotating magnetic media, e.g., a hard disk drive or a floppy disk drive, coupled to a host computer system or other host digital system have gained wide acceptance.

However, there are some drawbacks commonly found in flash memory devices. In order to achieve equal wear of memory cells in flash memory devices (e.g., NAND-based flash memory device), data to be written to a logical block address (LBA) is usually written to a different address in the Flash chip, namely the physical block address (PBA). The mapping between LBA-to-PBA is maintained by the Flash controller. Further, as erasing a block takes a significant amount of time, this is preferably done in a background task which replenishes a free block queue. Write requests then take blocks from this free block queue. In order to hide this complexity, a flash translation layer (FTL) is utilized. The FTL emulates a block device and allows the operating system to treat flash memory like any other block storage device, hence remaining ignorant of the flash devices characteristics. The implementation of a FTL is very dependent on the application area. The algorithms used in low-cost memory sticks for instance are very rudimentary whereas those in enterprise solid-state devices (SSDs) have to be rather sophisticated in order to ensure the demanded reliability.

A commonly used technique to implement a FTL is based on log-structured file systems and arrays. Mendel Rosenblum and John K. Ousterhout, The Design and Implementation of a Log-Structured File System, ACM Transaction on Computer Systems, 1992, as well as Jai Menon, "A Performance Comparison of RAID-5 and Log-Structured Arrays", Proc. Of $4^{th}$, IEEE Symposium on High Performance Distributed Computing 1995 provide detailed descriptions of such systems and arrays. Log-structured file systems and arrays have been introduced to group I/O operations and improve performance as they write new as well as updated data to new locations instead of writing it in place. During boot time, the LBA-to-PBA mapping has to be restored from the log-structured array which can be achieved by starting with the last checkpoint being written and reading all necessary data structures pointed to from this checkpoint. Current implementations do this by scanning the Flash memory at boot time. However, with increasing capacity of SSDs this can be extremely inefficient and time consuming. Current most advanced SSDs, such as, for example, the STec Zeus support sustained sequential read at 220 MB/s and have up to about 512 GB LBA capacity with a spare factor of 0.4. The NAND Flash storage drive from FusionIO has a sequential read performance of about 610 MB/s and generally a maximum capacity of 320 GB. If the raw capacity grows to 2 TB and assuming a sustained sequential read performance of 610 MB/s, it would take almost one hour to read the whole data from disk.

If checkpoint meta-data is being written block-aligned, i.e., checkpoint meta-data can only reside in the first page of a block, given a block size of 64 pages this process still takes almost one minute. This might be justifiable in an enterprise storage system but not in a desktop SSD. Another possibility to avoid scanning the whole Flash memory would be to store the LBA-to-PBA mapping information on a dedicated part of the Flash memory. However, depending on the workload, the region containing the LBA-to-PBA mapping might wear out much faster than the rest of the device. This would lead to an unnecessary early failure of the device and is therefore not desirable.

SUMMARY

According to one embodiment of the present invention, a method for facilitating fast reconstruction of metadata structures on a memory storage device is provided. The method includes writing a plurality of checkpoints holding a root to metadata structures in an increasing order of timestamps to a plurality of blocks respectively on the memory storage device utilizing a memory controller, each checkpoint is associated with a timestamp, wherein the last-written checkpoint contains a root to the latest metadata information from where metadata structures are reconstructed According to another embodiment of the present invention, a method for locating metadata structures in a memory storage device is provided. The method includes writing a plurality of checkpoints holding a root to metadata structures in an increasing order of timestamps to a page on each of a plurality of blocks respectively within a physical block address of the memory storage device, each checkpoint is associated with a timestamp; and performing a search on a limited number of pages on the memory storage device for the last-written checkpoint holding a root to the latest metadata information from where metadata structures are reconstructed.

According to yet another embodiment of the present invention, a system comprising a memory storage device having a plurality of blocks with pages for writing data; and a controller in signal communication with the memory storage device, the controller configured to write a plurality of checkpoints holding a root to metadata structures in an increasing order of timestamps to a page on each of a plurality of blocks respectively within a physical block address of the memory storage device and perform a search on a limited number of pages on the memory storage device for the last-written checkpoint holding a root to the latest metadata information from where metadata structures are reconstructed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments of the present invention are generally directed to flash memory systems and methods for efficiently locating meta-data structures on solid-state devices, such as, flash-based memory devices, which allows for fast reconstruction of metadata structures. Generally speaking, the systems and methods described herein place checkpoints, which identify the location of metadata structures, intelligently on the device so as to permit a more efficient method of locating such checkpoints. These techniques ensure best wear-leveling as all blocks on the device undergo the same wear-leveling strategy. The systems and methods described herein further provide a free block maintenance strategy that provides blocks freed by garbage collection for future checkpoint writes.

In its proper operating environment, the flash memory system is coupled to a host digital system, such as a host computer system or otherwise. The flash memory system provides nonvolatile mass storage for use by the host digital system. Data to be written in or to be read from the flash memory system is associated by the host digital system with one of a plurality of logical block addresses (LBA). The flash memory system transforms the logical block address into one of a plurality of physical block addresses in a well-known manner. As such, a mapping table between the addresses in the host side (LBA) and the physical addresses, which corresponds to the PBA, is required.

In one embodiment, the flash memory system comprises at least one flash memory device for storing the data and corresponding LBA and PBA mapping tables as well as other key information, and a controller for controlling operations performed by the flash memory system. In one embodiment, the controller is separate from the flash memory system. In an alternate embodiment, the controller is an integral part of the flash memory system itself. In yet another embodiment, the controller can be physically split into one or more sub-controllers each controlling a part of the flash memory device and/or performing only certain flash management tasks.

The term "controller" as used herein refers to an application specific integrated circuit (ASIC) or field programmable gate arrays (FPGA), and electronic circuit, one or more processors (shared, dedicated, or group) and memory that performs one or more software or firmware programs/algorithms, a combinational logic circuit, and/or other suitable components that provide the described functionality.

Figure 1:
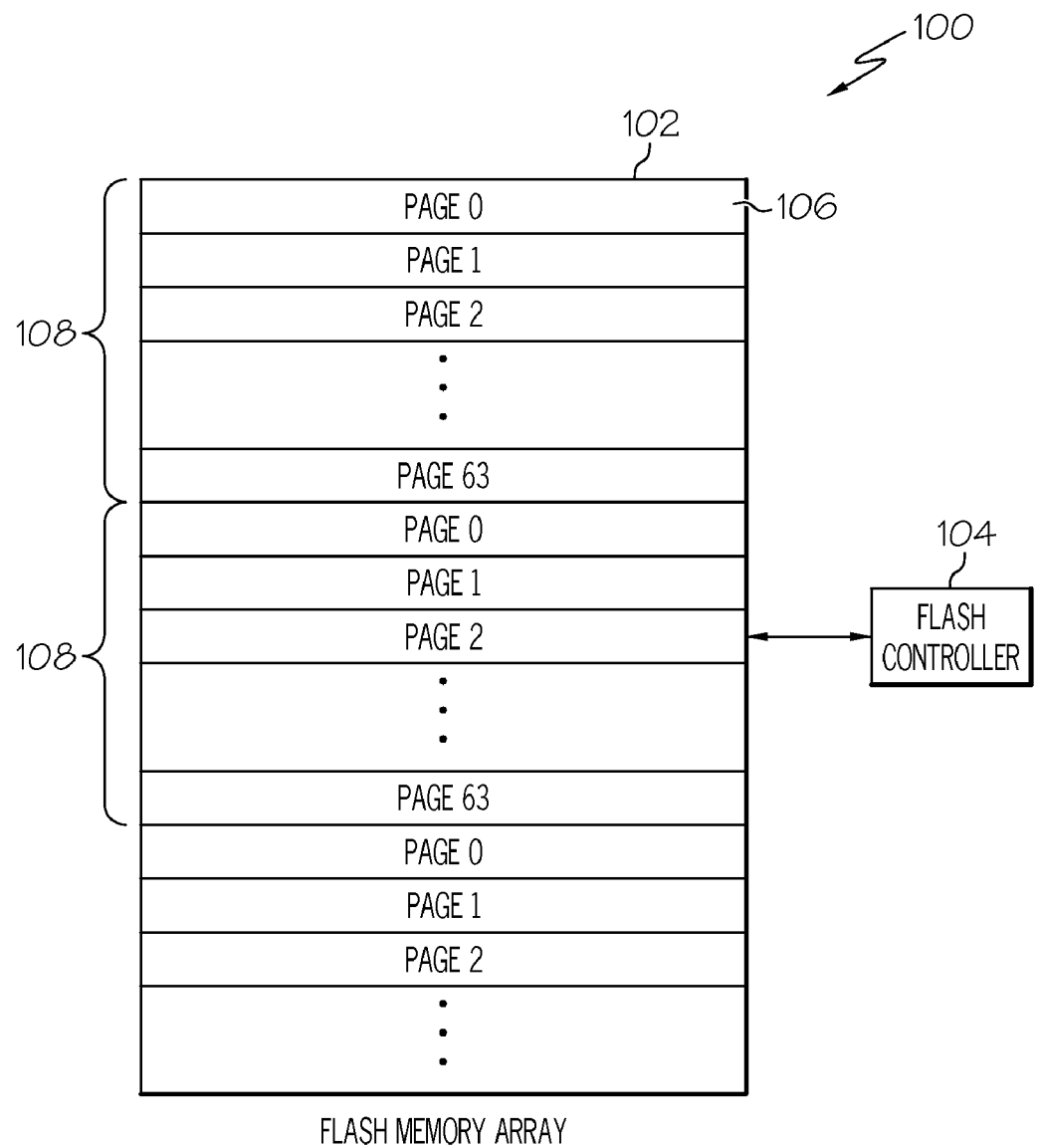
FIG. 1 is a block diagram of a flash memory storage device in accordance with one exemplary embodiment of the present invention.

FIG. 1 illustrates the basic elements of a flash memory device 100 and its architecture according to one exemplary embodiment of the present invention. The flash memory device 100 generally includes a flash memory array 102 in signal communication with a controller 104. The controller 104 controls the necessary functionalities (e.g., wear-leveling, LBA-PBA mapping tables, maintaining these mappings tables, garbage collection, etc.) of the flash memory device and performs a checkpoint localization algorithm for efficiently locating metadata structures in the flash memory device in accordance with one embodiment. The flash memory array 102 includes a number of pages 106 grouped together in blocks 108 (e.g. 64 pages per block). This exemplary structure allows one to scale the chips much smaller. The blocks in the flash memory array might be physically on different flash memory chips and the flash memory chips might be grouped into channels through which the flash memory chips are controller by the controller 104 and should not be limited to the configurations shown herein. Therefore, the flash memory array can be seen as a contiguous virtual memory space over all flash memory chips present in the flash memory system. The number of blocks and pages per block as well as the number of chips and channels can vary depending on the application and should not be limited to the configurations shown herein.

The flash memory device 100 includes metadata structures, which comprises of one or a number of key information, such as, for example, LBA-to-PBA mapping tables, a bad block list, error correction codes, etc. These metadata structures are saved on the flash memory device 100 along with normal data and reconstructed at boot-time. These metadata structures can be separated into checkpoints or checkpoint regions, the root metadata information from where the whole metadata structure can be reconstructed, and the metadata information to which the checkpoint is pointing. Thus, a checkpoint is a position in the log at which all of the data structures in the flash memory system are consistent and complete. During operation, a checkpoint at a fixed location on the flash memory array is read at boot time to initialize its main metadata structures. There can be many checkpoints stored on the device; however, only one holds the latest root metadata information. In other words, the last-written checkpoint contains the root to the most recent metadata information, such as the LBA-PBA mapping table. All other checkpoints are outdated. A checkpoint as described herein can include a single or multiple pages or blocks depending on the implementation of the flash translation layer and should not be limited to the composition described herein.

Checkpoints can be written with metadata to any page in the whole PBA space of the flash memory array. As such, no space is dedicated to hold key information where the checkpoints are located. This approach optimizes the wear of all blocks at the cost of some limited amount of searches in the PBA space. However, this limited amount of searches is significantly lower than traversing the whole PBA space. To do so, checkpoints are written in increasing order of PBAs. This may result in a wrap over when the end of the flash memory array is reached. In other words, the next checkpoint is written somewhere at the beginning of the array. At any time, garbage collection must ensure that no valid checkpoint lies between the youngest written checkpoint and the next checkpoint to be written. Each checkpoint written on the flash memory array is associated with a timestamp, which can be provided by a counter or other means configured to increase over time. This may result in a timestamp counter overflow, which can be solved by using a timestamp window that is much smaller than the size of the counter. The timestamp window size can be evaluated from the frequency at which checkpoints are being written and the device capacity, which will be described in more detail.

In accordance with one embodiment, the controller 104 sequentially places the checkpoints with time stamps to allow for fast recovery of metadata. The checkpoints, which can be seen as the root of metadata, are written in increasing order of time stamps on PBAs. As such, the last-written checkpoint contains the root to the most recent metadata.

Figure 2:
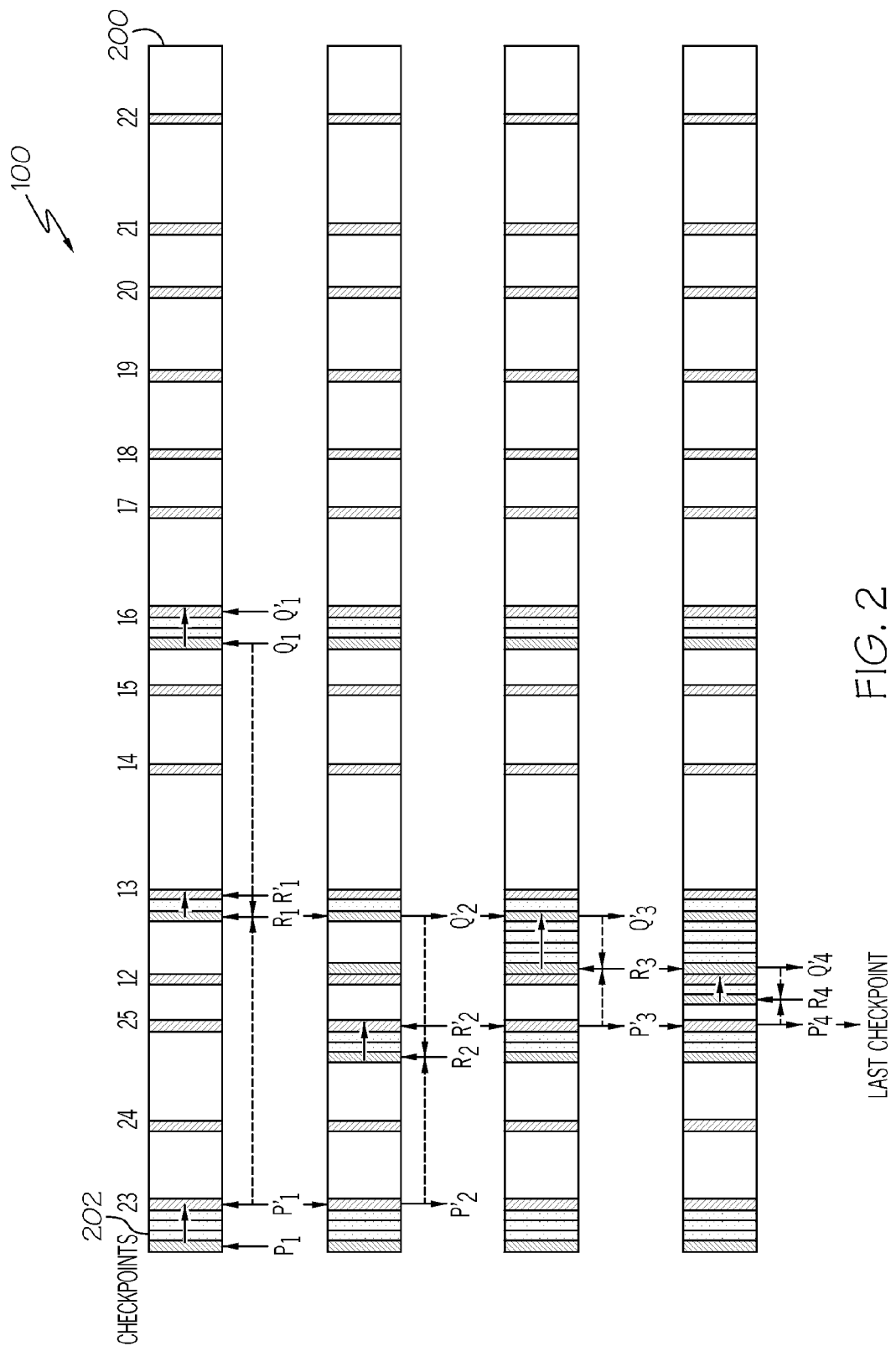
FIG. 2 is a schematic illustrating the implementation of a checkpoint localization algorithm in accordance with one exemplary embodiment of the present invention.

The process of the checkpoint localization algorithm performed by the controller 104 in accordance with one exemplary embodiment is illustrated in FIG. 2. The checkpoint localization algorithm as described herein efficiently locates the latest checkpoint with metadata on a flash memory device, such as memory device 100. As can be seen, a PBA space 200 of the memory device 100 is shown. The PBA space 200 includes a number of pages 202 with no block boundaries shown. In this embodiment, metadata is treated as normal data (wear-leveled) with no fixed blocks reserved, however metadata does not appear in the LBA-PBA map. Because timestamps are written in increasing order, the latest checkpoint and hence the most recent metadata is located at the checkpoint with the latest timestamp. The timestamps increase in time over the physical length of the device as shown.

In operation, starting points or pages are selected from which scanning begins as shown in FIG. 2. In one embodiment, the first page in the PBA space 200 and a page that is half the space are selected as starting points for the scanning of checkpoints. Of course, the selection can be shifted anywhere along the PBA space 200. For example, a page in the middle of the PBA space 200 and a page at the end of the PBA space 200 can be selected. In this example, the first page in the PBA with address $P_1$ is selected while another page with address $Q_1$, which is half the space, is selected. Once the starting pages are selected, the closest checkpoint from each of the selected pages is searched. The search can be performed in increasing, decreasing, or both PBA address directions. In this example, the closest checkpoint from $P_1$ is at address $P'_1$ while the closest checkpoint from $Q_1$ is at address $Q'_1$ when the search is performed in increasing PBA address direction. Then, time stamp counters from these checkpoints are read from the page metadata. In this example, the timestamp for the checkpoint at $P'_1$ is 23 while the timestamp for the checkpoint at $Q'_1$ is 16. Although the checkpoint found in address $P'_1$ is more recent than checkpoint found in address $Q'_1$, there may be a more recent checkpoint than the checkpoint at $P'_1$ with timestamp 23. This is verified by determining whether the distance between the two checkpoints ($P'_1$ and $Q'_1$) is less than a calculated interval. If it is, then it can be concluded that the youngest or latest checkpoint has been found, which in this case would be $P'_1$. If not, depending on which checkpoint is more recent, at address $P'_1$ or $Q'_1$, another page is selected based on that address. In this case, $P'_1$ has a more recent checkpoint than $Q'_1$ and the distance between the two is not less than the calculated interval. At this point, it can be determined on which side the most recent checkpoint is located on, which in this case is the left side. Therefore, a page in the middle of the interval between $P'_1$ to $Q_1$ is selected. In this example, $R_1$ is selected. After this selection, the closest checkpoint from $R_1$ is searched (either from the left or right), which in this example is a checkpoint with address $R'_1$ with a timestamp of 13 as shown (searching in increasing PBA address direction). At this point, three checkpoints have been located with one checkpoint with timestamp 23 still being the most recent checkpoint. However, a more recent checkpoint can exist between $P'_1$ and $R_1$, but such checkpoint should exist between $P'_1$ and $R_1$ since the checkpoints are written in increasing order. Now a page in the middle of addresses $P'_1$ and $R_1$, which are now denoted as $P'_2$ and $Q'_2$ respectively, is selected. The pages $P'_1$ and $R_1$ are now denoted as $P'_2$ and $Q'_2$ respectively to illustrate the new pages from which scanning begins. In this example, the selected page is found at address $R_2$. Then, the nearest checkpoint from $R_2$ is searched. Here, the nearest checkpoint from $R_2$ is found at address $R'_2$ with a timestamp of 25 when searching in increasing PBA address direction. At this point, the checkpoint at address $R'_2$ is more recent than the checkpoint at $P'_2$. Because the checkpoints are written in increasing order in the PBA space 200, a page is selected in the middle of $R'_2$ and $Q'_2$, which are now denoted as $P'_3$ and $Q'_3$ respectively. In this case, the page selected between $P'_3$ and $Q'_3$ is $R_3$, which is after a checkpoint. However, a search for the nearest checkpoint from $R_3$ is still performed. In this case, no checkpoint exists between $R_3$ and $Q'_3$. This means that the most recent checkpoint exists on the other side of the interval. Following the procedure above, a page is selected between $P'_3$ and $R_3$, which are now denoted as $P'_4$ and $Q'4$ respectively (the new pages from which scanning begins). Further, another middle page is selected. In this example, the new middle page becomes $R_4$. As the procedure suggests, a search for the nearest checkpoint is performed from $R_4$, which in this example is found with a timestamp of 12. At this point, the entire interval between $P'_4$ and $R_4$ is checked by coincidence. At this point one would have to select another middle page between $P'_4$ and $R_4$ if the minimum distance larger than a calculated interval or no such calculated interval is given. However, here the interval between $P'_4$ and $R_4$ is smaller than the calculated interval corresponding to the minimum distance between two checkpoints, there can't be another checkpoint in the interval $P'_4$ and $R_4$. As such, the youngest checkpoint is either the checkpoint with a timestamp of 25 or the checkpoint with a timestamp of 12. Because the checkpoints are written in increasing timestamp order, it is concluded that the most recent checkpoint is found with the timestamp of 25. In another embodiment where no minimum distance between two checkpoints is defined, one would have to continue choosing middle pages and scanning intervals until all pages in between which the most recent checkpoint may exist are examined.

With the method described above, the most recent checkpoint can be located in an efficient manner through the easy-to-apply rules described above. The checkpoint located holds the key information about the metadata that has been written most recently. Therefore, key information, such as the root of the LBA to PBA mapping tables, can be identified by the last checkpoint written before the device was powered down.

Figure 3:
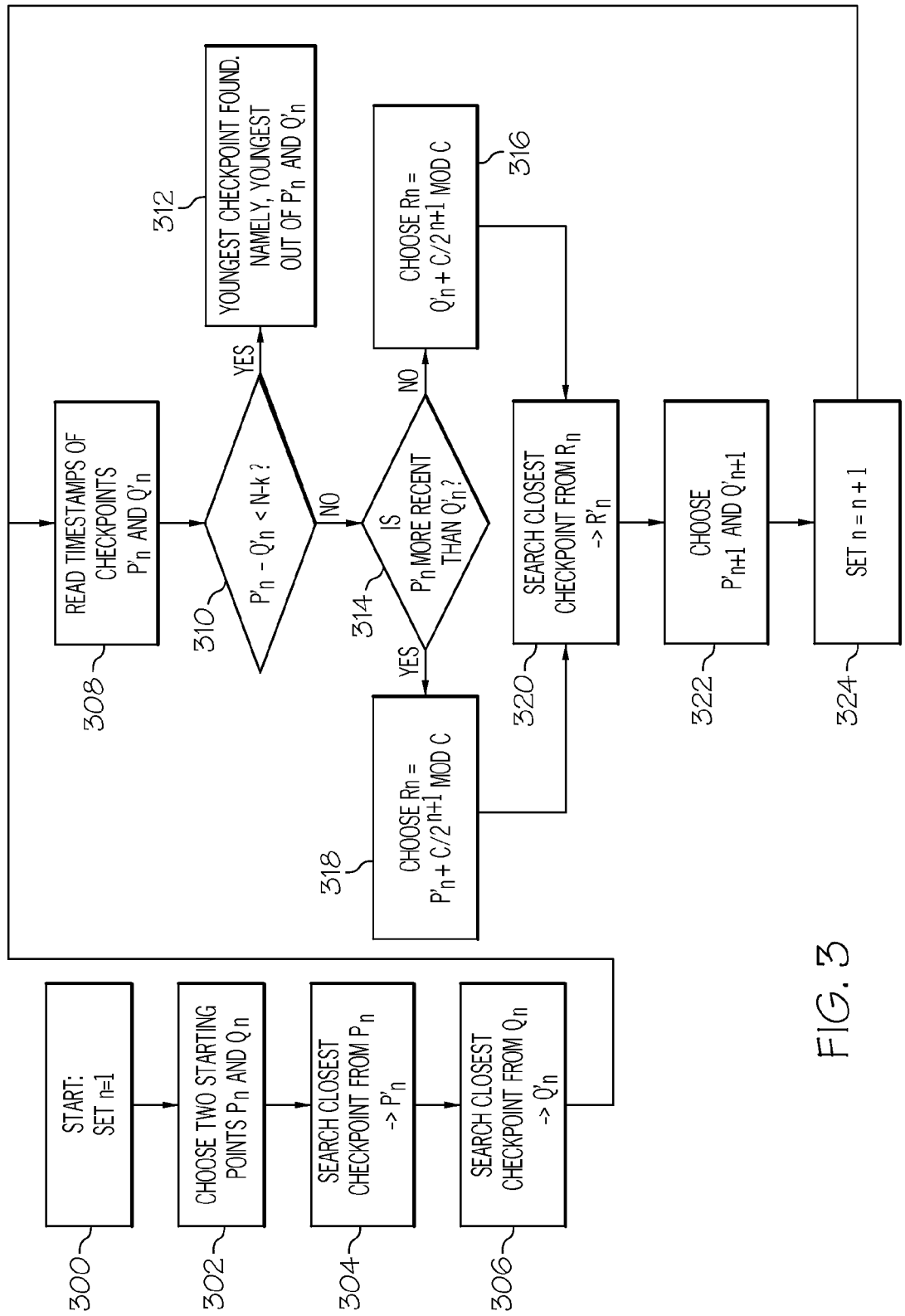
FIG. 3 is a flow diagram of a method for efficiently locating metadata structures in flash memory devices in accordance with one exemplary embodiment of the present invention.

FIG. 3 illustrates a flow diagram of a method for efficiently locating metadata structures in flash memory devices implemented by the controller 104 in accordance with one exemplary embodiment. As described herein, $P_n$, $Q_n$, $R_n$, etc. denote addresses in the LBA space. Beginning the operation at block 300, set n to 1. At block 302, choose two starting points/pages $P_n$ and $Q_n$. Using the example illustrated in FIG. 2, these starting points would be $P_1$ and $Q_1$ since n is set to 1. In accordance with one embodiment, two starting points with address $P_1$=i mod C and $Q_1$=C/2+i mod C are selected (mod being the modulo operation that find the remainder of division of one number by another), where i is an arbitrary integer in the interval [0, C/2]. Search the closest checkpoint from $P_n$ at block 304. At block 306, search the closest checkpoint from $Q_n$. The searches can be performed in increasing, decreasing, or both PBA address directions. The search in block 304 and 306 results in two checkpoints $P'_n$ and $Q'_n$ being found. In the example above, this would be $P'_1$ and $Q'_1$. Next, read the timestamps of checkpoints $P'_n$ and $Q'_n$ at block 308. In the same example, this would be 23 and 16. At block 310, determine whether $P'_n - Q'_n < N-k$. In other words, determine whether the distance between $P'_n$ and $Q'_n$ is less than a calculated interval. In one embodiment, N is the number of data pages being written after which a new checkpoint should be inserted in average, C denotes the total PBA space in number of pages, and k is an arbitrary integer chosen in the interval $1 \leq k \leq N/2$ that limits the window in which a new checkpoint should be written. If the answer is yes, the youngest checkpoint is found at block 312. As such, relevant metadata structures can be read. If the answer is no, determine whether $P'_n$ is more recent than $Q'_n$ at block 314. If the answer is yes, choose a new starting point $R_n$ where $R_n = P'_n + C/2^{n+1} \mod C$, at block 316. If the answer is no, choose a new starting point $R_n$ where $R_n = Q'_n + C/2^{n+1} \mod C$ at block 318. Proceeding to block 320, search the closest checkpoint from $R_n$. At block 322, choose new starting points $P'_{n+1}$ and $Q'_{n+1}$ by incrementing n by 1 at block 324. Blocks 308-324 are performed with n incrementing until the most recent checkpoint has been located. Eventually, the latest checkpoint will be located, such as, in the example above, the checkpoint with timestamp 25.

Figure 4:
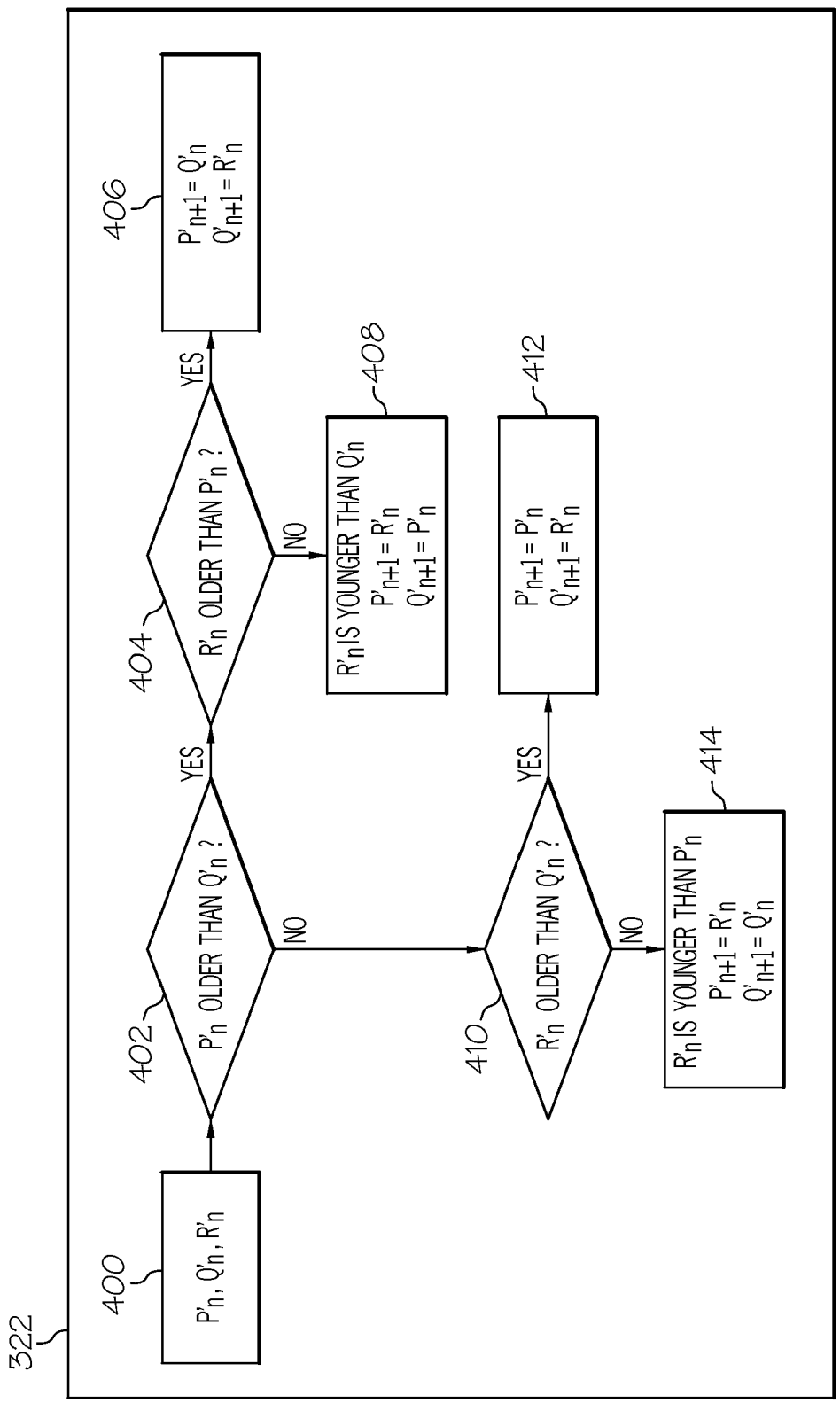
FIGS. 4-5 are flow diagrams of different methods for choosing new starting points in an operational block of FIG. 3 in accordance with one exemplary embodiment of the present invention.

The new starting points $P'_{n+1}$ and $Q'_{n+1}$ at block 322 in FIG. 3 can be chosen in several ways. FIG. 4 illustrates a flow diagram of one method for choosing new starting points $P'_{n+1}$ and $Q'_{n+1}$ in accordance with one exemplary embodiment. At block 400, $P'_n$, $Q'_n$, and $R'_n$ are chosen. At block 402, it is determined whether $P'_n$ is older than $Q'_n$. In other words, it is determined whether $P'_n$ is less recent than $Q'_n$. If the answer is yes, it is determined whether $R'_n$ is older than $P'_n$ at block 404. If the answer to block 404 is yes, then $P'_{n+1} = Q'_n$ and $Q'_{n+1} = R'_n$ at block 406. If the answer is no, then $R'_n$ is younger than $Q'_n$ making $P'_{n+1} = R'_n$ and $Q'_{n+1} = P'_n$ at block 408. If the answer to block 402 is no, it is determined whether $R'_n$ is older than $Q'_n$ at block 410. If the answer is yes, then $P'_{n+1} = P'_n$ and $Q'_{n+1} = R'_n$ at block 412. If the answer is no, then $R'_n$ is younger than $P'_n$ making $P'_{n+1} = R'_n$ and $Q'_{n+1} = Q'_n$ at block 414.

Figure 5:
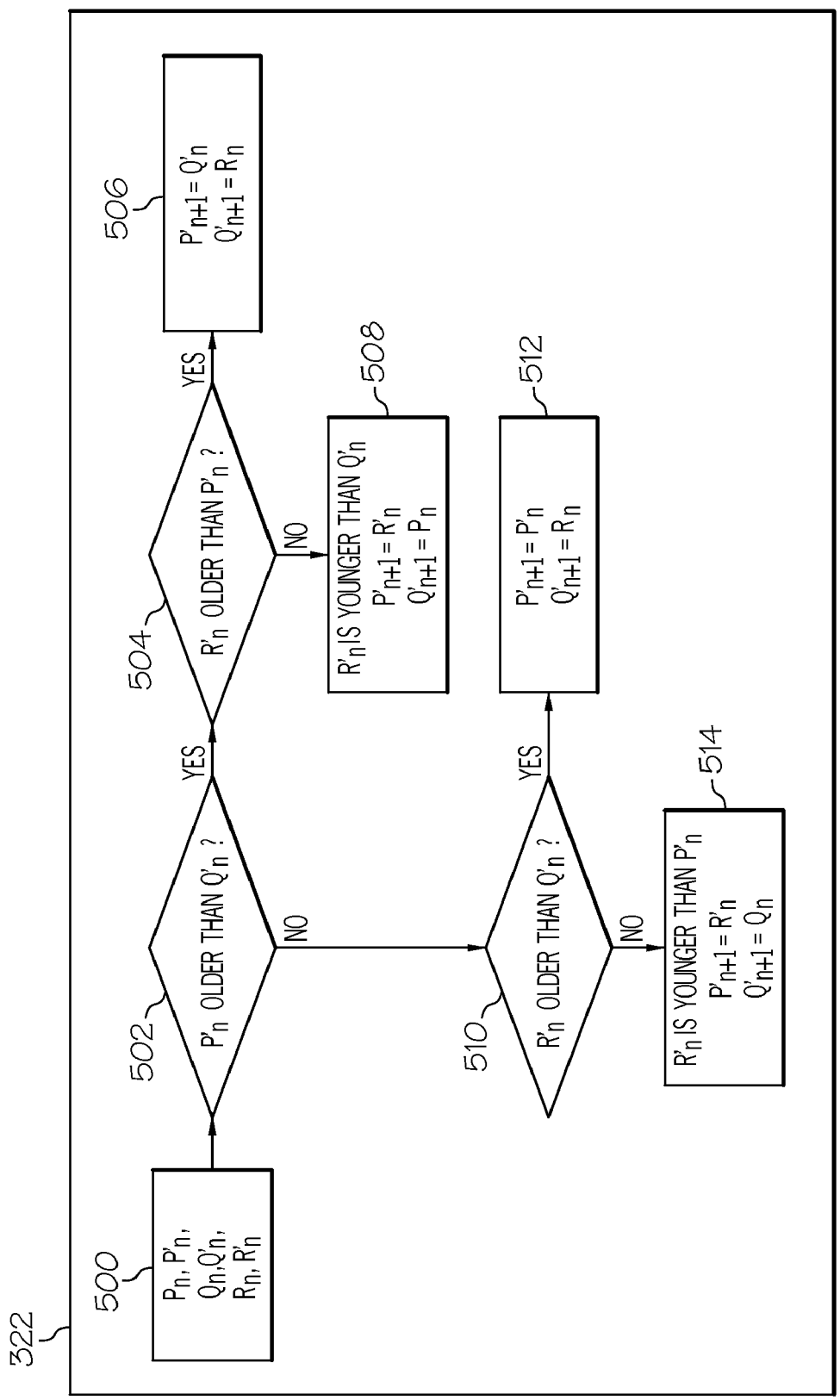

FIG. 5 illustrates a flow diagram of an alternative method for choosing new points $P'_{n+1}$ and $Q'_{n+1}$ by excluding already searched intervals when searching into increasing PBA address directions from the new search interval in accordance with one exemplary embodiment. At block 500, $P_n$, $P'_n$, $Q_n$, $Q'_n$, $R_n$, $R'n$ are chosen. At block 502, it is determined whether $P'_n$ is older than $Q'_n$. If the answer is yes, it is determined whether $R'_n$ is older than $P'_n$ at block 504. If the answer to block 504 is yes, then $P'_{n+1} = Q'_n$ and $Q'_{n+1} = R_n$ at block 506. If the answer to block 504 is no, then $R'_n$ is younger than $Q'_n$ making $P'_{n+1} = R'_n$ and $Q'_{n+1} = P_n$ at block 508. If the answer to block 502 is no, it is determined whether $R'_n$ is older than $Q'_n$ at block 510. If the answer is yes, then $P'_{n+1} = P'_n$ and $Q'_{n+1} = R_n$ at block 512. If the answer is no, then $R'_n$ is younger than $P'_n$ making $P'_{n+1} = R'_n$ and $Q'_{n+1} = Q_n$ at block 514. Analogously, the method described in FIG. 5 that excludes already searched intervals can be adapted to searching into decreasing PBA address directions, or searching into both, increasing and decreasing PBA address directions of course.

Because the checkpoints are written in increasing order and are more or less equally spaced, this minimizes or limits the number of pages in the device to be scanned as illustrated above. Thus, the controller must ensure that checkpoints are written more or less uniformly over the PBA space or the whole storage capacity. This is accomplished by a free block maintenance strategy.

In accordance with one embodiment, a block maintenance strategy is performed by the controller 104 to ensure that checkpoints can be written on the device and written uniformly over the whole storage capacity. In other words, the block maintenance strategy ensures that there are pages in a certain range in which checkpoints can be written in the device in advance so that future checkpoints can be written in an orderly and uniform manner enabling for the checkpoint localization algorithm described above to perform as intended. The flash memory system described herein implements a garbage collection algorithm or other algorithm used to free up blocks within a flash-based memory device, such as flash memory device 100. The free blocks are maintained in a free block queue, which is separated into two different queues in accordance with one embodiment. In accordance with one embodiment, one queue, referred to as the normal free queue (NFQ), is consumed by normal writes while the other queue, referred to as the checkpoint free queue (CPFQ) is consumed by checkpoint metadata writes.

Figure 6:
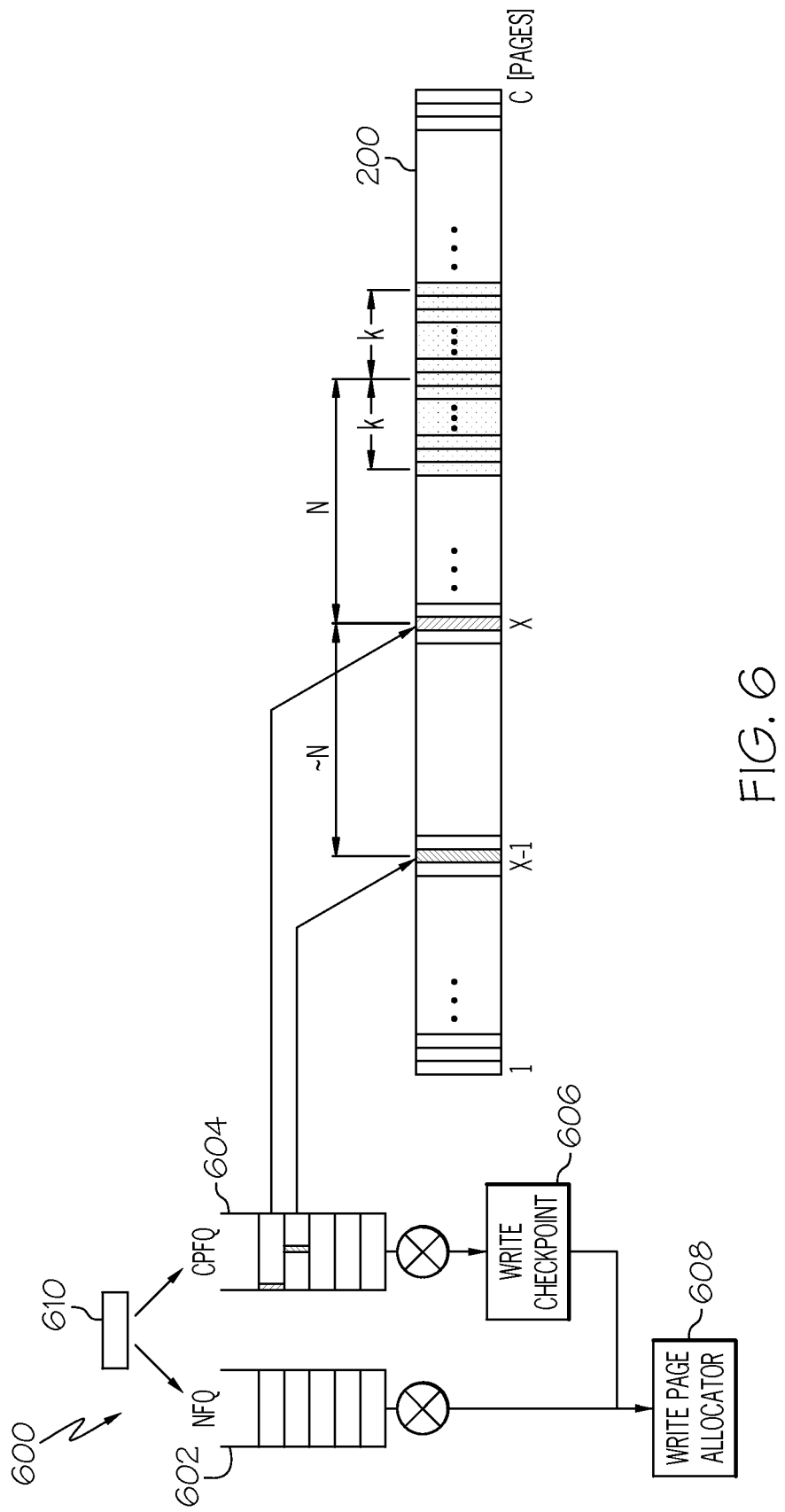
FIG. 6 illustrate a schematic of a free block queue in accordance with one exemplary embodiment of the present invention.

FIG. 6 illustrates a free block queue 600 in accordance with one exemplary embodiment. The free block queue 600 comprises of a normal free queue 602 and a checkpoint free queue 604 used to write normal data and checkpoints for metadata respectively. After a checkpoint is written in a page from the CPFQ 604 as indicated by write checkpoint module 606, remaining pages can be used for normal writes by a write page allocator 608. For each new free block with pages, such as free block 610, freed by garbage collection, it is maintained either in the normal free queue 602 or the checkpoint free queue 604. Free blocks are placed in the NFQ 602 or the CPFQ 604 based on whether or not the free block is located in a calculated interval. This will be better explained by way of example. As shown in FIG. 6, free block 610 is placed either in NFQ 602 or CPFQ 604. This free block 610 has a certain address in the PBA space 200 as shown. Consider the address X of the last element in the CPFQ 604. If the address of a page in the new block is in the interval [X+N−k, X+N+k], where k is a constant in the interval $1 \leq k \leq N/2$ and X is the position of the page reserved for the last future checkpoint, then free block 610 will be inserted in the CPFQ 604. Otherwise, free block 610 is inserted in NFQ 602.

Figure 7:
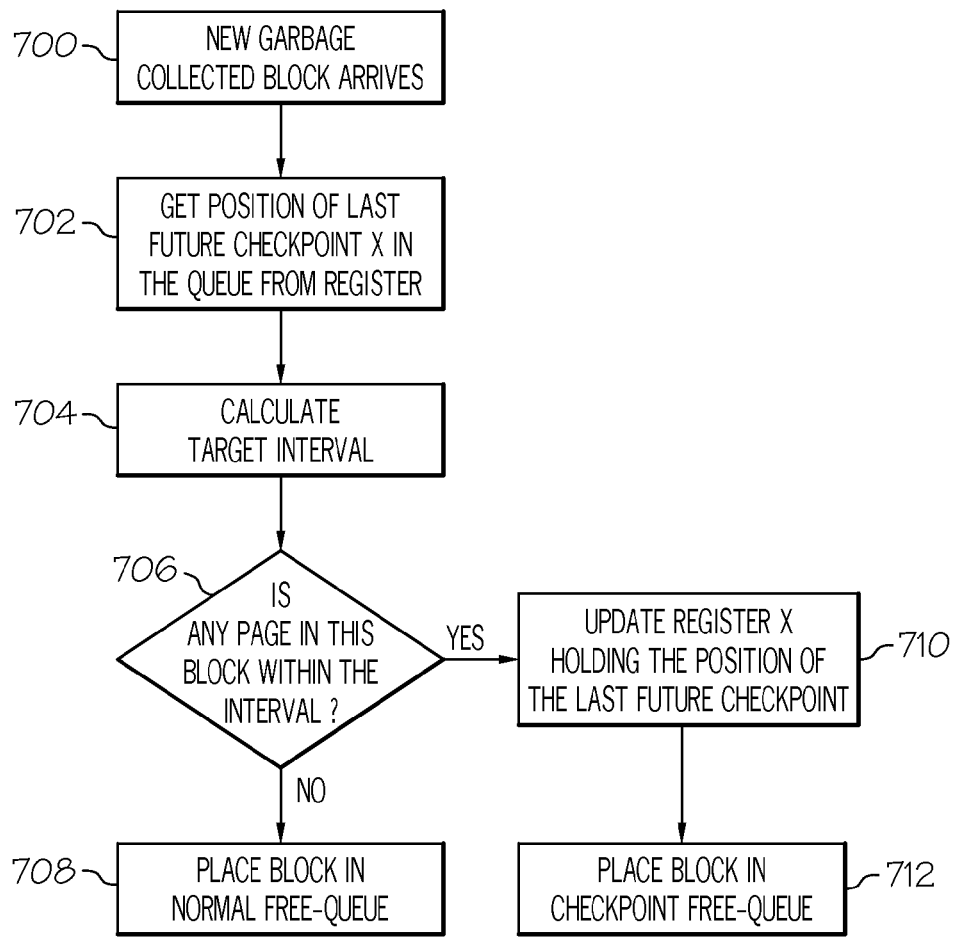
FIG. 7 illustrates a flow diagram of a method for filling an normal free queue and a checkpoint free queue in accordance with one exemplary embodiment of the present invention.

FIG. 7 illustrates a flow diagram of a method for filling the NFQ and the CPFQ in accordance with one exemplary embodiment. At block 700, a new garbage collected block arrives. Using the example above, the newly garbage collected block is 610. The position of the last future checkpoint X residing in the last block in the CPFQ is obtained from register RX holding that value at block 702. At initialization time, the value X of register RX can be set to any page in the PBA space [0, C−1]. Next, a target interval is calculated at block 704. In one embodiment, the calculation of the target interval is based on the position X of the page reserved for the last future checkpoint to be written, which in accordance with one embodiment, is [X+N−k, X+N+k]. In this interval, N is the average space in the number of pages between two checkpoints and k is a constant in the interval $1 \leq k \leq N/2$. In one exemplary embodiment, the next target interval must be wrapped over if $X+N+k \leq C$, where C denotes the total PBA space in the number of pages, resulting in two intervals [X+N−k, C−1] and [0, X+N+k mod C]. At 706, it is determined whether any page in this block is within the interval. If the answer is no, the block is placed in the normal-free queue 602 at block 708. If the answer is yes, update register RX holding the position of the last future checkpoint at block 710. As such, the new position X corresponds to the first page in this block belonging to the interval [X+N−k], X+N+k]. Alternatively, any page from the block that belongs to this interval could be chosen. In this case, the exact position of the page in the block must be maintained as it will be used when writing this checkpoint. Then, the free block is placed in the checkpoint free-queue 604 at block 712.

It should be understood that the value of k can be increased if for several times no block with a candidate page for the CPFQ has been found in accordance with other exemplary embodiments of the present invention. This will increase the probability to find one.

Figure 8:
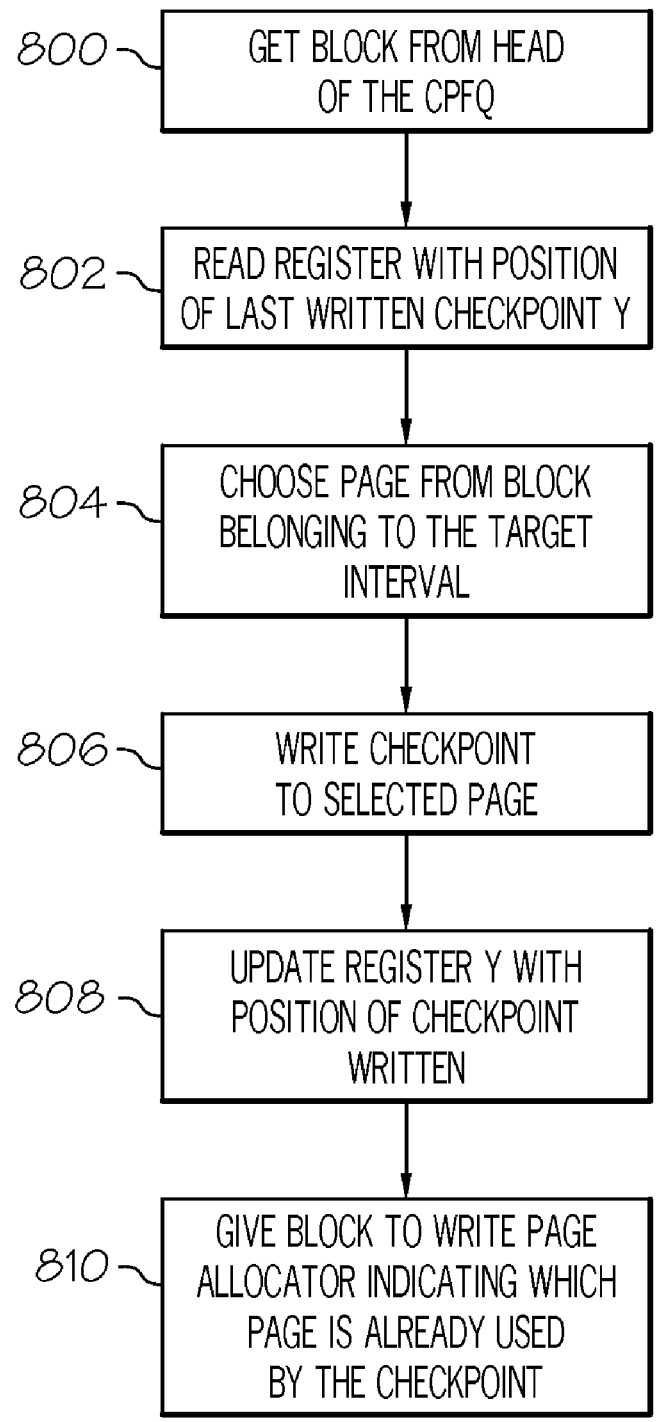
FIG. 8 illustrates a flow diagram of a method for writing a checkpoint in the memory storage device in accordance with one exemplary embodiment of the present invention.

FIG. 8 is a flow diagram illustrating a method for writing a checkpoint in accordance with one exemplary embodiment. At block 800, take a block from the head of the CPFQ 604. It should be understood that at block 800 garbage collection of new block 610 holding a page in the target interval can be triggered if the length of the CPFQ falls below a certain preconfigured threshold in order to ensure that always enough blocks are available in the CPFQ. Next, read register RY with position of last written checkpoint Y at block 802. Y is taken from the value stored at the previous block of the method illustrated in FIG. 8 and is initialized at the beginning to X from register RX. At block 804, choose page from block belonging to the target interval. The first page belonging to the target interval or any page from the block belonging to the target interval can be utilized. In any case, page from block belonging to the target interval is utilized, and then the page is chosen according to the value stored for that block in block 710 of FIG. 7. Then, write checkpoint to selected page at block 806. At block 808, update the register Y with position of checkpoint written. Give block to write page allocator 608 indicating which page is already used by the checkpoint at block 810. The indication which page is already used in the block is important so that the page allocator will not serve that page for a write request. Note that meta-data information (e.g., LBA-PBA map, bad block table, etc.) except for checkpoints, is written as normal data using the write page allocator 608.

Although, the embodiments described herein discuss locating pages that hold checkpoint information. A checkpoint page could be anywhere within a block. Checkpoints can also be block aligned (e.g., a checkpoint is a full block). Since blocks do not have a spare region for metadata, one would have to store the bits that identify a checkpoint into the spare region of the first page of that block.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified, or certain steps (e.g., the scanning of pages) may be performed in parallel if the structure of the flash memory device allows this. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for facilitating fast reconstruction of metadata structures on a memory storage device, comprising:
writing a plurality of checkpoints holding a root of metadata structures in an increasing order of timestamps to a plurality of blocks respectively on the memory storage device utilizing a memory controller, each checkpoint is associated with a timestamp, wherein a last-written checkpoint contains a root to a latest metadata information from where metadata structures are reconstructed.

2. The method of claim 1, wherein timestamps of the plurality of checkpoints increase in time over a physical block address space of the memory storage device, the physical block address space includes the plurality of blocks.

3. The method of claim 2, wherein the plurality of checkpoints are written about equidistant from one another over the physical block address space of the memory storage device or written unevenly from one another over the physical block address space of the memory storage device.

4. The method of claim 3, wherein the plurality of checkpoints are written equidistant from one another by maintaining blocks on the memory storage device freed by a garbage collection process in a free block queue.

5. The method of claim 4, wherein blocks freed by the garbage collection process are maintained by placing freed blocks with any page outside an interval in a first queue and placing freed blocks with a page on the interval in a second queue.

6. The method of claim 5, wherein the first queue is a normal free queue consumed by future normal writes while the second queue is a checkpoint free queue consumed by future checkpoint writes.

7. The method of claim 5, wherein the interval is based on a position of a page reserved for a last future checkpoint to be written.

8. The method of claim 7, wherein the interval is [X+N−k, X+N+k], where k is a constant in the interval $1 \leq k \leq N/2$, X is the position of the page reserved for the last future checkpoint to be written, and N is an average space in a number of pages between two checkpoints.

9. The method of claim 1, wherein metadata information includes logic block address to physical block address mapping tables, error correction codes, a bad block list, or a combination thereof.

10. The method of claim 1, wherein the memory storage device is a flash-based memory storage device.

11. A method for locating metadata structures in a memory storage device, comprising:

writing a plurality of checkpoints holding a root of metadata structures in an increasing order of timestamps to a page on each of a plurality of blocks respectively within a physical block address of the memory storage device, each checkpoint is associated with a timestamp; and performing a search on a limited number of pages on the memory storage device for a last-written checkpoint holding a root to a latest metadata information from where metadata structures are reconstructed.

12. The method of claim 11, wherein performing a search for the last-written checkpoint comprises:

selecting a first and a second starting page in a physical block address space of the memory storage device;

searching for a checkpoint closest to the first starting page and a checkpoint closest to the second starting page;

reading the timestamps associated with the checkpoint closest to the first starting page and the checkpoint closest to the second starting page;

calculating whether the distance between the checkpoint closest to the first starting page and the checkpoint closest to the second starting page is less than a calculated interval; and determining whether the last-written checkpoint has been located based on the calculation, the last-written checkpoint having a greatest timestamp among the plurality of checkpoints written in the memory device.

13. The method of claim 12, wherein the last-written checkpoint is located when the distance between the checkpoint closest to the first starting page and the checkpoint closest to the second starting page is less than the calculated interval.

14. The method of claim 12, wherein new starting pages are selected until a distance between checkpoints found closest to the new starting pages is less than the calculated interval.

15. The method of claim 12, wherein the calculated interval is found by equation N−k, where N is the average space in a number of pages between two checkpoints, and k is an arbitrary integer in the interval $1 \leq k \leq N/2$.

16. The method of claim 11, wherein timestamps of the plurality of checkpoints increase in time over a physical block address space of the memory storage device.

17. The method of claim 11, wherein the plurality of checkpoints are written equidistant from one another over a physical block address space of the memory storage device or written unevenly from one another over the physical block address space of the memory storage device.

18. The method of claim 17, wherein the plurality of checkpoints are written equidistant from one another by maintaining blocks on the memory storage device freed by a garbage collection process in a free block queue.

19. The method of claim 18, wherein blocks freed by the garbage collection process are maintained by placing freed blocks with any page outside an interval in a first queue and placing freed blocks with a page on the interval in a second queue, the first queue is a normal free queue consumed by future normal writes while the second queue is a checkpoint free queue consumed by future checkpoint writes.

20. The method of claim 19, wherein garbage collection of a new block having a page in a target interval is triggered if a length of the checkpoint free queue falls below a certain threshold.

21. A system, comprising:

a memory storage device having a plurality of blocks with pages for writing data; and a controller in signal communication with the memory storage device, the controller configured to write a plurality of checkpoints holding a root to metadata structures in an increasing order of timestamps to a page on each of a plurality of blocks respectively within a physical block address of the memory storage device and perform a search on a limited number of pages on the memory storage device for a last-written checkpoint holding a root to a latest metadata information from where metadata structures are reconstructed.

22. The system of claim 21, wherein the plurality of checkpoints are written about equidistant from one another over a physical block address space of the memory storage device or written unevenly from one another over the physical block address space of the memory storage device.

23. The system of claim 22, wherein the plurality of checkpoints are written equidistant from one another by maintaining blocks on the memory storage device freed by a garbage collection process in a free block queue.

24. The system of claim 23, wherein blocks freed by the garbage collection process are maintained by placing freed blocks with any page outside an interval in a first queue and placing freed blocks with a page on the interval in a second queue.

25. The system of claim 24, wherein the interval is based on a position of a page reserved for a last future checkpoint to be written, the interval is [X+N−k, X+N+k], where k is a constant in the interval $1 \leq k \leq N/2$, X is the position of the page reserved for the last future checkpoint to be written, and N is an average space in a number of pages between two checkpoints.

* * * * *